March 14, 1961    H. PETER    2,975,295

REPEATER WITH PHOTOELECTRIC CONTROL

Filed Nov. 24, 1959    2 Sheets-Sheet 1

INVENTOR:

Helmut Peter

INVENTOR:
Helmut Peter

United States Patent Office 2,975,295
Patented Mar. 14, 1961

2,975,295

REPEATER WITH PHOTOELECTRIC CONTROL

Helmut Peter, Erlangen, Germany, assignor to P. Gossen & Co. G.m.b.H., Erlangen, Germany Filed Nov. 24, 1959, Ser. No. 855,184

Claims priority, application Germany Feb. 5, 1959

9 Claims. (Cl. 250—237)

This invention relates to positioning devices and in particular to devices which automatically position a movable element in regulators or the like in correspondence to the position of the indicator in a master control or the like.

It is an object of this invention to provide an automatic control for the above-identified devices wherein the action of the follower mechanism will produce a minimum inertial loading effect upon the master mechanism whose position is to be followed.

It is a further object of the invention to provide a device which will automatically follow the position of a pointer without loading or adding any inertial effect to impede the movement of the pointer.

It is another important object of this invention to provide a position repeater for a meter needle by use of photoelectric means operative to control an electric motor in a receiver device.

It is yet another object of this invention to provide a novel circuit and mechanical arrangement of the type described which is distinguishable from prior similar devices by its simple construction, accurate operation as well as complete technical simplicity.

Other objects will in part be obvious and will in part be explained hereinafter.

Figure 1:
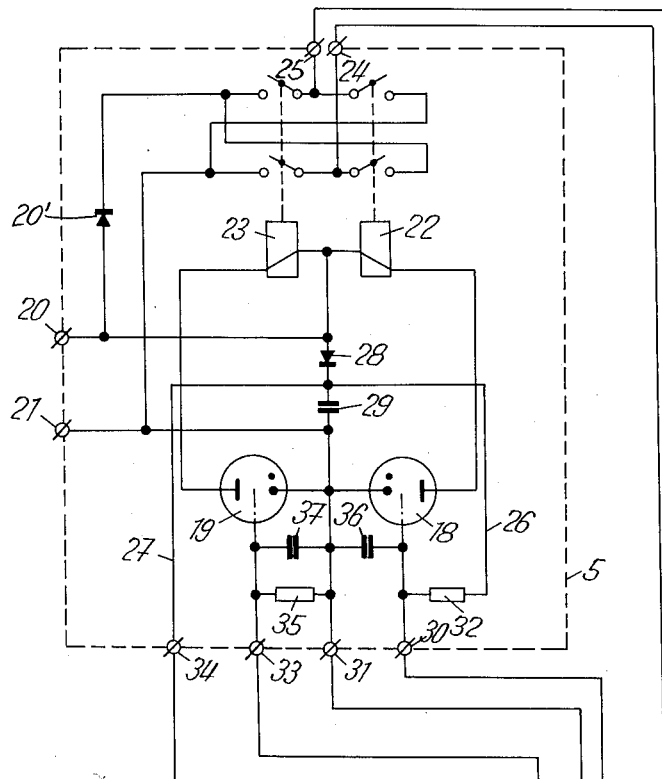
Figure 1:
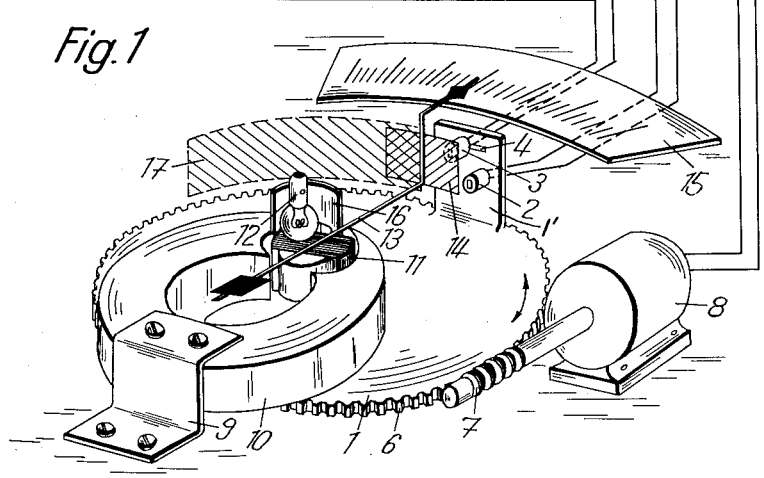
Figure 2:
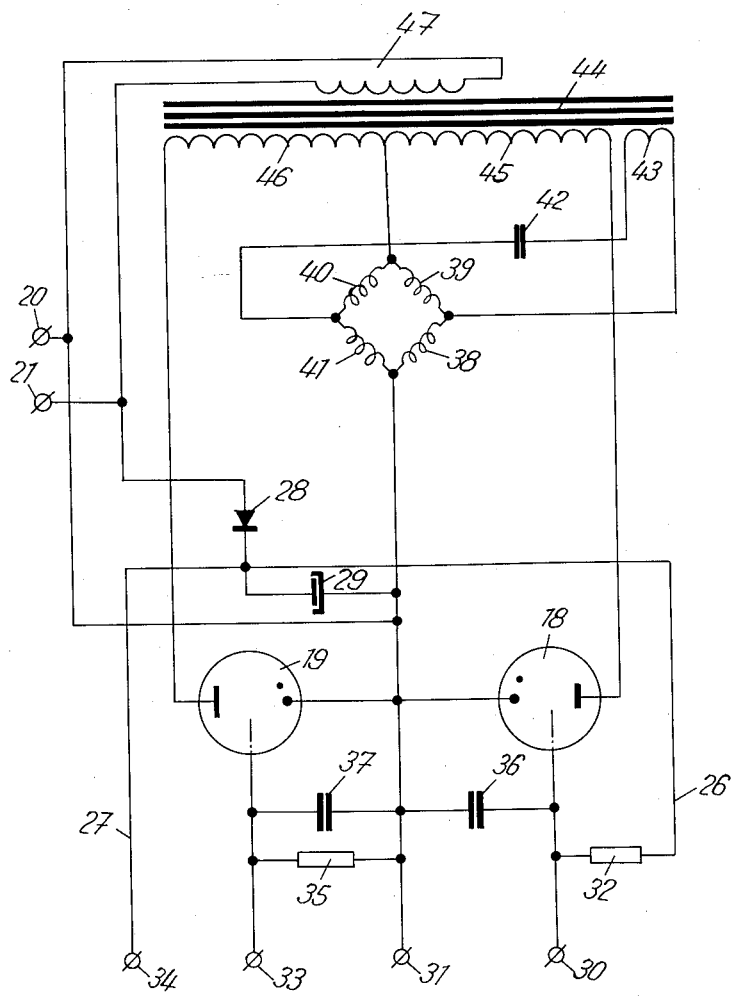

For a more complete understanding of the nature and scope of this invention reference may be had to the following detailed description, which may be read in connection with the accompanying drawings in which:

Fig. 1 is a schematic and somewhat pictorial representation of but one embodiment of this invention; and Fig. 2 is a schematic diagram of a modification of the control circuit of Fig. 1.

Referring now to Fig. 1 a movable element such as a flat toothed disc 1 is designed to drive a follower mechanism such as a regulator or graph mechanism in correspondence with the movement of a master element, which is represented by the pointer 13 of a meter. A pair of photocells 2 and 3 are mounted along a small peripheral angle of the disc 1 on two levels above the plane of the disc by means of an upstanding plate 1' which is integral with the disc. The plate 1' is provided with a horizontal slot 4 for peripheral adjustment of the photocell 3. Each of the photocells 2 and 3 is electrically connected to a switching circuit generally designated 5. A worm 7 tangentially positioned with respect to the disc 1 meshes with a plurality of teeth 6 integral with the periphery of the disc 1 for movement thereof. An electric control motor 8 electrically connected to the circuit 5 is mechanically secured by its armature to the shaft of the worm 7 for rotation thereof.

Fixedly mounted above the disc 1 by means of a supporting angle 9 is a master element such as the moving coil meter arrangement which includes the magnetic poles 10 and the moving coil 11, so that the rotating axis of the moving coil is positioned above the rotating axis of the disc 1. A conveniently connected illuminating bulb 12 is mounted above the moving coil 11.

A needle pointer 13 formed into the shape of a step is secured to the moving coil 11 for movement thereby and carries an opaque mask 14 on its mid-member, as shown. The mask is advantageously large enough so that it can cover both photocells and prevent direct illumination thereof by the lamp 12. The pointer end of the needle 13 is positioned for movement along a scale 15. An illumination limiting opaque screen 16 is mounted upon the coil 11 adjacent the bulb 12 for movement with the pointer 13, and is positioned to cast a shadow 17 in the dark zone identified by the cross-hatching. Both the mask 14 and the screen 16 are made of a dark and extremely light weight material of thin cross sections, so as to add little weight and inertial effect to the movement of the galvanometer coil and needle. As stated the moving coil meter arrangement is representative of a master control wherein the position of the pointer 13 is to be followed by the disc 11.

In the embodiment of Fig. 1 the circuit generally designated 5 and within the area circumscribed by the broken line includes as its most important elements two cold cathode thyratrons 18 and 19 having cathodes connected directly to one terminal 21 of a suitable A.C. source and having anodes each connected to an opposite terminal 20 of the beforementioned A.C. source. The A.C. at the terminals 20, 21 also serves to charge the plates of a capacitor 29 by means of a diode 28. The coils of a pair of relays 22 and 23 are serially connected in the current path from each of the anodes to the terminal 20. The terminals 20 and 21 are connected to the terminals 24 and 25 associated with the motor 8 by means of the contacts of relays 22 and 23 and a rectifying diode 20' to provide power thereto; the contacts in the relays serving to selectively turn the motor on and off in accordance with the automatic operation of this device. The contacts 24 and 25 are arranged to invert the current direction to the motor as determined by the energization of the relays 22 and 23. The direction of rotation of the motor is thus selectively determined in the circuit 5.

The starting circuit of the thyratron 18 includes the photocell 2 which is connected from the control electrode thyratron 18 to the negative cathode of thyratron 18 at terminals designated 30 and 31, and a resistor 32 connected from the positive side of capacitor 29 by means of a line 26 to the control or starting electrode of tube 18. Thus the voltage across photocell 2 as determined in part by the series resistor 32 will start conduction in tube 18.

The starting circuit of the thyratron 19 includes the photocell 3 connected from the control electrode to the positive side of capacitor 29 by means of line 27 at terminals designated 33 and 34, and a serially connected control electrode to cathode resistor 35. Thus the voltage across series resistor 35 as determined in part by the photocell 3 forming a voltage divider therewith will start conduction in tube 19.

Conduction in the thyratrons is newly initiated during every positive half cycle of A.C. potential on the anode from the terminals 20 and 21 if the control electrode is sufficiently biased during each positive half cycle. Once conduction is initiated it continues for the remainder of the half cycle until the anode potential is not sufficient to maintain conduction. During illumination of the photocell 2 its impedance is so low that its characteristic voltage drop in insufficient for lighting the tube 18. The opposite conditions are applied to the thyratron 19. Here the photocell 3 connected by means of a pair of terminals 33 and 34 operates as a compensating resistance to the circuit of the starter electrode and the cathode and a resistance 35. Therefore, a voltage sufficient to ignite the tube 19 does not appear upon the starting electrode thereof when the photocell 3 is not illuminated and as a result has a high impedance. A pair of capacitors 36 and 37 connected between the starting electrodes of the thyratrons 18 and 19, respectively, serve to provide improved starting operation.

The entire apparatus now operates as follows: If the pointer 13 moves clockwise then in addition to the photocell 3, the photocell 2 will be shaded. Therefore, its impedance will increase. The thus increased voltage from the control electrode to cathode serves to ignite the tube 18. This switches the motor 8 into the circuit of the relay 22 and motor and the disc 1 turn as long as cells 2 and 3 are shaded and until the cell 2 is again illuminated and the tube 18 is cut off.

If the pointer moves counterclockwise then in addition to photocell 2 being illuminated photocell 3 is illuminated. At this point its internal impedance becomes so low that a sufficiently high potential is created on the starting electrode of the tube 19 to ignite the tube 19. The subsequently operated relay 23 connects the motor 8, and the disc 1 is turned in the direction opposite to which it previously turned until the photocell 3 is again shaded by the mask 14 so as to again extinguish the tube 19.

The relative position of the photocells may be adjusted to be sufficiently close to each other by means of the slot 4 so that the room for play in which the mask 14 can operate without turning on the switching apparatus is small. The "dead zone" is therefore quite narrow and the repeater accuracy consequently high.

An interpreting apparatus which may for example be a scribe or a graph or a magnified pointer may be conveniently mounted along the axis of the disc 1 or on peripheral teeth 6.

The mask 16 mounted near the lamp 12 on the moving coil 11 serves to assure proper operation when the pointer 13 with its mask 14 suddenly shifts to a measuring position past both photocells as a result of a strong and rapid signal. Both cells then remain in the shaded area 17 to produce an effect identical to that which would occur due to a small rise in the value of the control signal when both of the cells are conveniently covered by the mask 14. Essentially the purpose of mask 16 is to extend the mask 14 without adding extra inertia and torsional strain upon the needle near its outer end.

Referring to Fig. 2 another advantageous embodiment of the circuit designated by the numeral 5 in Fig. 1 and including the winding of motor 8 is herein described. In contrast to the embodiment of Fig. 1 no switching relays are necessary because a Ferraris type two phase motor with four windings 38, 39, 40 and 41 is used in place of motor 8. The windings, in the manner shown, are combined in the circuits of the cathodes of thyratrons 18 and 19. The Ferraris motor is provided with a constant field voltage which is taken off the phase shift condenser 42 of a secondary winding 43 of a transformer 44. The transformer 44 is also provided with a center tapped secondary winding whose halves 45 and 46 are placed in the circuit as voltage sources for the anode circuits of both thyratrons. The primary winding 47 of the transformer is connected to the terminals 20 and 21 which are in turn connected to a source of current.

When both thyratrons are extinguished the Ferraris motor is kept at a standing position. However, if one of the tubes is ignited then the motor becomes energized by a voltage provided by one of the halves 45 or 46 of the secondary winding of the transformer 44. The phase relationships in the windings are arranged so that the armature moves in one or the other direction in accordance with which of the both thyratrons are conductive. The advantage of this embodiment of the invention resides in the direct operation of the motor and in the reduced time lag between the movement of the needle and the response of the disc as a result of the fact that no relays are used.

A further simplification of the circuit apparatus may be made if the power required to move the follower is low. A self running synchromotor may be used as the drive motor 8 in this case wherein the armature is comprised of two separated lamination and field windings for producing various directions of rotation and wherein the field windings are directly connected in the anode circuits of the thyratrons. This obviates the need for the transformer 44.

If photo-resistors of correspondingly high impedance are used in place of the photocells then both the need for thyratrons and the corresponding switching means may be obviated. The field windings of the motors can then be connected directly to a source of current in series with the photoresistors.

It will be noted that the accuracy of the instruments disclosed herein is maximized by the existence of a light border created by the masks.

The above explained invention is not intended to be limited to the illustrated embodiments with the structure of pointer and masks but may also be used with the same advantage in an instrument where light is used in place of the pointer 13. In this case the accompanying optical apparatus is not arranged in the form of a light pointer but in the form of a light band which primarily has the construction of the zones 17 shown in Fig. 1. This light band is then to be placed in the vicinity of the photocells 2 and 3 so that in the normal case a perpendicular edge of a light band will be positioned between the photocells 2 and 3.

Since other changes may be made in the above-described construction and different embodiments of the invention may be made without departing from the spirit and scope thereof it is intended that all matter contained in the above description and shown in the accompanying drawings shall be considered illustrative and not in a limiting sense.

What is claimed is:

1. A control apparatus for moving a follower in response to the position of a marker in a meter movement comprising a pair of movable photoelectric elements movable along the path of said marker and mounted on said follower for movement thereby, an illumination source mounted adjacent said meter movement for illuminating said elements, a mask on said marker mounted adjacent said elements and having a leading edge movable by said marker between said elements and said source, said mask having an area to successively shade each of said elements upon movement of said marker, and electric means connected to said photoelectric elements for movement of said follower in response to the illumination and shading of said elements, said electric means including first means for moving said follower in the direction toward said leading edge when said elements are in a position where each of said elements is illuminated and second means for moving said follower in a direction toward the edge of said mask when said mask and said elements are positioned so that both of said elements are shaded and shade means for extending the shaded area of said mask behind said leading edge.

2. A control apparatus as set forth in claim 1 wherein said shade means for extending said shading includes a second mask mounted on said marker.

3. A control apparatus for moving a follower means in response to a position of a needle in a galvanometer movement comprising a pair of photoelectric elements angularly spaced along the path of said needle, said elements being mounted on said follower means for movement along the path of said needle, an illuminating source positioned above the pivotal point of said needle in said galvanometer movement, whereby said elements may be energized, a mask mounted on said needle for movement therewith and adapted to be positioned by said needle between said illuminating source and said elements whereby said elements may be successively shaded, said mask having an area to simultaneously shade both of said elements, a second mask mounted near said illuminating means upon said needle for extending the shading area of said first mask with a minimum inertial effect upon movement of said needle, electric means connected to said photoelectric elements and said follower means including means for moving said follower means and said elements toward the shaded area behind said mask when each of said photoelectric elements is energized and for moving said follower means and said elements toward said illuminated side when both of said elements are shaded.

4. A control apparatus as set forth in claim 3, said electric means including a pair of thyratrons, means for making said thyratrons conductive during different conditions of illumination of said elements, a pair of relays responsive to said thyratrons, and motor means responsive to the condition of said relays and connected to said follower means for movement thereof.

5. A control apparatus as set forth in claim 3 wherein said electric means includes a pair of thyratrons connected to be conductive in accordance with different conditions of illumination of said photoelectric elements, and means including a split phase motor responsive to the conduction within said thyratron and connected to said follower means for movement of the motor in response to the illumination of said photoelectric elements.

6. A control apparatus as set forth in claim 5 wherein said electric means includes a transformer having one winding connected to said thyratrons, and second winding connected to the field of the split phase motor, a center tap in the first of said windings connected to the field of the split phase motor, said split phase motor being connected to said follower for movement thereof.

7. A photoelectric control comprising a motor, a rotatable follower member driven by said motor, a pair of photoelectric elements positioned on said follower, measuring means positioned above said follower element including a moving coil, wherein the axis of said moving coil coincides with the axis of said follower element, said measuring means including a pointer, a pair of masks secured to said pointer for movement therewith, one of said masks being mounted on said pointer for movement therewith, said one of said masks being positioned adjacent said photoelectric elements and the other of said masks being positioned near the axis of said moving coil to extend the masking area of said first mask in one direction, a pair of thryatrons connected to said photoelectric elements, a voltage supply connected to said thyratrons for operation in response to the ignition of said thyratrons and connected to said motor for energization thereof, connector means for connecting the starting electrodes of said thyratrons to said photocells, said connector means including a resistor serially connected with one of said photocells and connected at the junction with said photocell to the starting electrode of one of said thyratrons, said connector means including a second resistor connecting the other of said photocells across the control electrode and cathode of the other of said thyratrons.

8. A photoelectric control as set forth in claim 7 further comprising a motor control relay having windings connected to the anodes of said thyratrons and having contacts in the connections to said motor.

9. An apparatus as set forth in claim 7 further comprising a transformer, said transformer including a split secondary and a primary, circuit means connecting each portion of said split secondary to one of the anode circuits of said thyratrons, a split phase motor including a plurality of windings, said windings being included in the circuit from said transformer to one of said anodes and a phase shifting secondary on said transformer connected to said motor windings.

References Cited in the file of this patent
UNITED STATES PATENTS

| | | |
|---|---|---|
| 2,046,005 | Sprecker | June 30, 1936 |
| 2,361,973 | Smith | Nov. 7, 1944 |
| 2,829,275 | Golay | Apr. 1, 1958 |